United States Patent
Barfoot et al.

(10) Patent No.: US 11,248,879 B1
(45) Date of Patent: Feb. 15, 2022

(54) SOFT KILL LASER CONFIGURATION FOR GROUND VEHICLE THREATS

(71) Applicant: BAE Systems Information and Electronic Systems Integration Inc., Nashua, NH (US)

(72) Inventors: David A. Barfoot, Austin, TX (US); Jeffrey Easton, Leander, TX (US); Karl P. Herb, Austin, TX (US); Matthew F. Kepler, Austin, TX (US); Somit S. Mathur, Austin, TX (US); Michael W. Shaw, Austin, TX (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 0 days.

(21) Appl. No.: 16/916,251

(22) Filed: Jun. 30, 2020

(51) Int. Cl.
*F41H 11/02* (2006.01)
*G02B 26/08* (2006.01)
*F41H 13/00* (2006.01)

(52) U.S. Cl.
CPC ........... *F41H 11/02* (2013.01); *F41H 13/005* (2013.01); *G02B 26/0816* (2013.01)

(58) Field of Classification Search
CPC .... G02B 26/0816; F41H 13/005; F41H 11/02
See application file for complete search history.

(56) References Cited

U.S. PATENT DOCUMENTS

| | | | |
|---|---|---|---|
| 4,990,919 A * | 2/1991 | Manoogian | G01S 7/38 342/13 |
| 5,495,787 A * | 3/1996 | Boyer, III | F41H 11/02 102/293 |
| 7,961,133 B2 * | 6/2011 | Vollin | F41H 13/0043 342/14 |
| 9,715,009 B1 * | 7/2017 | Parker | G08G 5/0082 |
| 9,891,027 B2 * | 2/2018 | Rahav | F41H 5/007 |
| 10,907,940 B1 * | 2/2021 | Parker | F41H 11/02 |
| 11,181,346 B1 * | 11/2021 | Barfoot | F41H 11/02 |
| 2014/0102288 A1 * | 4/2014 | Yeshurun | F41H 11/02 89/36.17 |
| 2019/0195601 A1 * | 6/2019 | Fin | F42B 12/208 |

* cited by examiner

*Primary Examiner* — Arman B Fallahkhair
(74) *Attorney, Agent, or Firm* — Sand, Sebolt & Wernow LPA; Scott J. Asmus (57) ABSTRACT

A laser mast for attachment to a ground vehicle includes a mast, a rotary stage, a platform, a first laser, and a second laser. The rotary stage is connected to and rotates the mast. The platform is connected to the rotary stage. The first laser is within the mast. The second laser is within the rotary stage or the platform.

18 Claims, 4 Drawing Sheets

SOFT KILL LASER CONFIGURATION FOR GROUND VEHICLE THREATS

STATEMENT OF GOVERNMENT INTEREST

This invention was made with government support under Contract No. SD01901 awarded by United States Government. The government has certain rights in the invention.

TECHNICAL FIELD

The present disclosure generally relates to a system for diverting a missile fired at an area that is to be protected, such as a vehicle, structure, or bunker. More specifically, the present disclosure relates to a system for diverting a missile fired at a ground vehicle. Specifically, the present disclosure relates to a system that includes lasers for diverting a missile fired at a ground vehicle.

BACKGROUND

Army vehicles encounter missiles fired from launchers that utilize optical guidance systems. Some current countermeasure systems that use a relatively low energy laser or electromagnetic mechanism to divert missiles are referred to as a soft-kill countermeasure (SKCM), where-as firing a projectile to intercept the missile is referred to as a hard-kill countermeasure (HKCM). Another term used, where an infrared laser beam is pointed in a specific direction by a gimbal mechanism is a Directable Infrared Countermeasure or DIRCM. Some vehicles with a SKCM may include a countermeasure system that utilize a laser that causes the missile to miss the vehicle. These systems include a single integrated optical path of mirrors and a beam tube which increases the cost of the countermeasure system and reduces the flexibility of the countermeasure system as the countermeasure system may utilize lasers with specific irradiances (either wavelength irradiances or power irradiances). This limits the type of threats that the countermeasure system may cause to miss the vehicle.

SUMMARY

For at least the reasons stated herein, there is a continuing unmet need for a countermeasure system that includes more than one optical path for emitting lasers and/or a countermeasure system that is capable of firing multiple lasers that have varying irradiances. Aspects of the present disclosure are directed to these continuing unmet needs.

In one aspect, an exemplary embodiment of the present disclosure may provide a laser mast for attachment to a ground vehicle or platform comprising: a mast including a first aperture and a second aperture; a rotary stage connected to the mast, wherein the rotary stage rotates the mast; a platform connected to the rotary stage; a first laser source that is within the mast; and a second laser source that is within the rotary stage or the platform. In this exemplary embodiment or another exemplary embodiment, the present disclosure may provide wherein when the laser mast is attached to the vehicle, the first laser source is vertically above the second laser source. In this exemplary embodiment or another exemplary embodiment, the present disclosure may provide wherein the first laser source is within the mast and the second laser source is within the rotary stage or the platform. In this exemplary embodiment or another exemplary embodiment, the present disclosure may provide wherein the first laser source emits a first laser that exits the mast at the first aperture and the second laser source emits a second laser that exit the mast at the second aperture. In this exemplary embodiment or another exemplary embodiment, the present disclosure may provide when the laser mast is attached to the vehicle, the first aperture is vertically below the second aperture. In this exemplary embodiment or another exemplary embodiment, the present disclosure may provide: a first mirror within the mast, wherein the first mirror is fixedly attached to the mast and wherein the first mirror reflects the first laser; and a second mirror within the mast, wherein the second mirror is rotatably attached to a pivot and wherein the second mirror reflects the second laser. In this exemplary embodiment or another exemplary embodiment, the present disclosure may provide wherein the first mirror reflects the first laser at a first angle and the second mirror reflects the second laser at a different second angle. In this exemplary embodiment or another exemplary embodiment, the present disclosure may provide wherein the first laser has a first irradiance and the second laser has a different second irradiance. In this exemplary embodiment or another exemplary embodiment, the present disclosure may provide wherein the first laser has a greater irradiance than the second laser.

In another aspect, an exemplary embodiment of the present disclosure may provide A method for diverting an incoming threat from a ground vehicle comprising: detecting an incoming threat; in response to detecting the incoming treat, determining a first angle of arrival of the incoming threat; emitting a first laser from a laser mast connected to the vehicle, wherein the first laser is emitted from the laser mast at the first determined angle of arrival; emitting a second laser from the laser mast, wherein the second laser is emitted from the laser mast at the first determined angle of arrival; and diverting the incoming threat from the vehicle with the first laser or the second laser. In this exemplary embodiment or another exemplary embodiment, the present disclosure may provide wherein the first laser and the second laser have different irradiances. In this exemplary embodiment or another exemplary embodiment, the present disclosure may provide wherein the second laser has an irradiance that is less than an irradiance of the first laser. In this exemplary embodiment or another exemplary embodiment, the present disclosure may provide rotating the laser mast to the first determined angle of arrival; and in response to rotating the laser mast to the first determined angle of arrival, emitting the first laser and the second laser at the first determined angle of arrival. In this exemplary embodiment or another exemplary embodiment, the present disclosure may provide determining a second angle of arrival of the incoming threat; rotating the laser mast to the second determined angle of arrival; and in response to rotating the laser mast to the second angle of arrival, emitting the first laser and the second laser at the second determined angle of arrival. In this exemplary embodiment or another exemplary embodiment, the present disclosure may provide wherein the second laser is emitted towards a launcher that fired the incoming threat. In this exemplary embodiment or another exemplary embodiment, the present disclosure may provide wherein the second laser prevents a guidance system of a launcher that fired the incoming threat from altering the trajectory of the incoming threat. In this exemplary embodiment or another exemplary embodiment, the present disclosure may provide wherein the first laser causes a guidance system of the incoming threat to alter the trajectory of the incoming threat. In this exemplary embodiment or another exemplary embodiment, the present disclosure may provide wherein the first laser causes the guidance system of the incoming threat to alter the trajectory of the incoming threat towards the second laser. In this exemplary embodiment or another exemplary embodiment, the present disclosure may provide emitting the first laser toward the ground a distance away from the vehicle, wherein the distance away from the vehicle is determined as a function of a type of the vehicle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
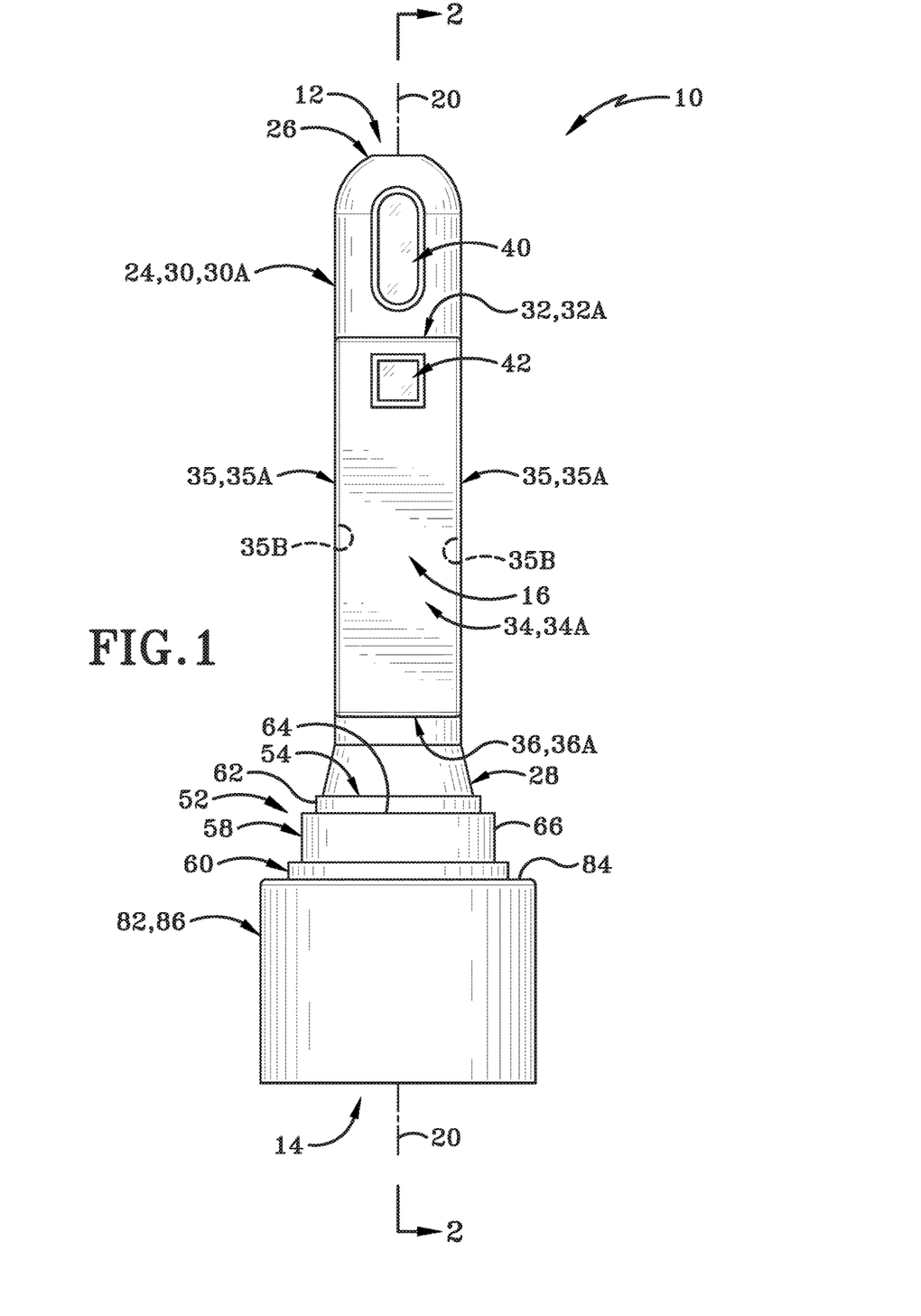
FIG. 1 (FIG. 1) depicts a laser mast that attaches to a vehicle and emits laser beams.
Figure 2:
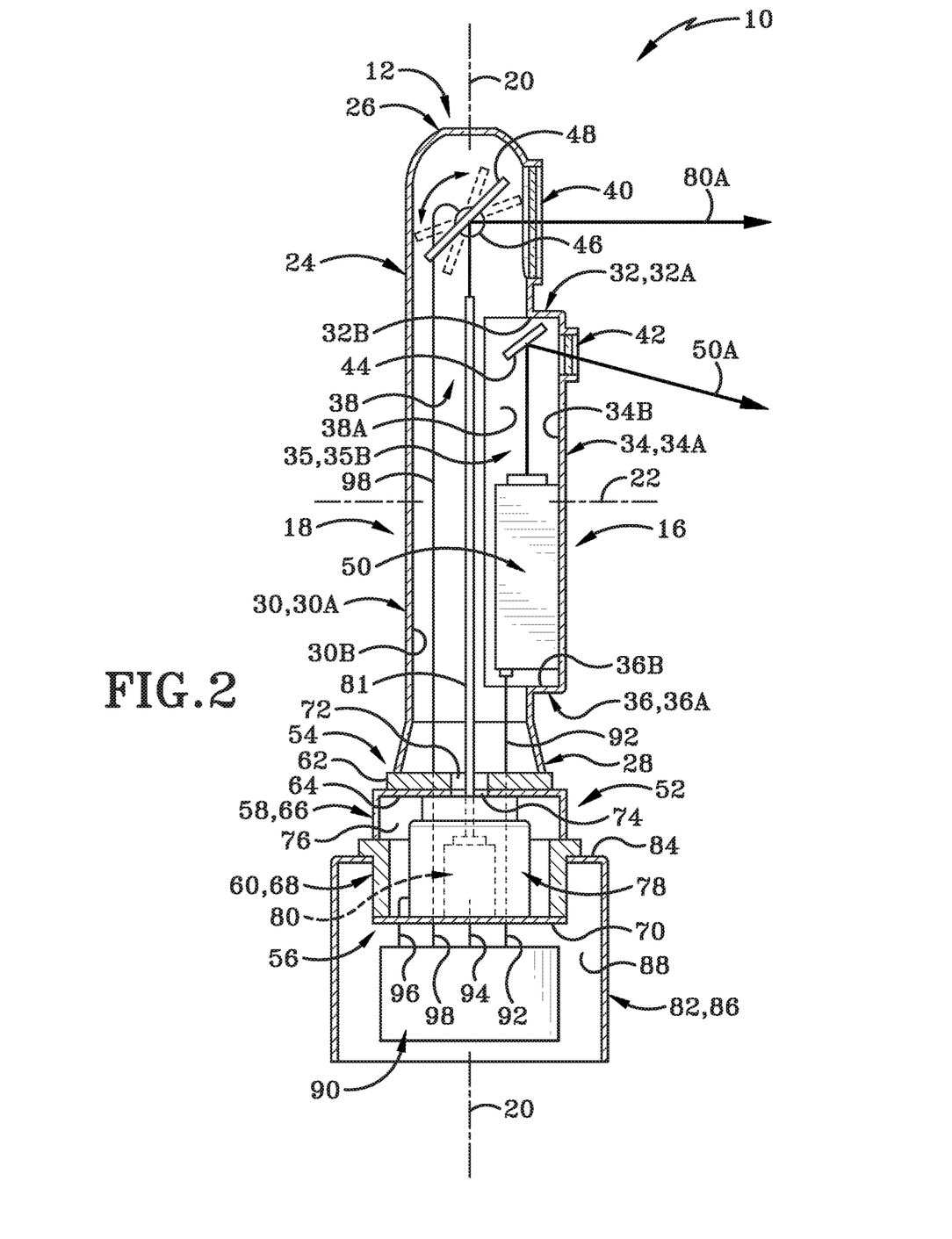
FIG. 2 (FIG. 2) is a cross sectional view of the laser mast of FIG. 1 taken along the line 2-2.

FIGS. 1 and 2 depict a laser mast 10. The laser mast 10 includes a top end 12, a bottom end 14 that is opposite the top end 12, front side 16, and a back side 18 that is opposite the front side 16. A central vertical axis 20 extends between the top end 12 and the bottom end 14. A central horizontal axis 22 extends between the front side 16 and the back side 18. The central horizontal axis 22 is perpendicular to the central vertical axis 20.

The laser mast 10 includes a mast 24. The mast 24 includes a top end 26 and a bottom end 28 that is opposite the top end 26. The mast 24 further includes a cylindrical wall 30. The cylindrical wall 30 extends longitudinally with respect to the central vertical axis 20 between the top end 26 and the bottom end 28 of the mast 24. The mast 24 further includes a top horizontal wall 32, a vertical wall 34, opposing side walls 35, and a bottom horizontal wall 36. The top horizontal wall 32 and the bottom horizontal wall 36 extend longitudinally with respect to the central horizontal axis 22 between the cylindrical wall 30 and the vertical wall 34. The vertical wall 34 extends longitudinally with respect to the central vertical axis 20 between the top horizontal wall 32 and the bottom horizontal wall 36 and extends between the opposing side walls 35. The top horizontal wall 32 and the bottom horizontal wall 36 is perpendicular to the cylindrical wall 30 and the vertical wall 34. The vertical wall 34 is perpendicular to the top horizontal wall 32 and the bottom horizontal wall 36 and is parallel to the cylindrical wall 30.

The cylindrical wall 30 is generally cylindrical in shape and defines an outer surface 30A and an inner surface 30B. The top horizontal wall 32 defines an outer surface 32A and an inner surface 32B. The vertical wall 34 defines an outer surface 34A and an inner surface 34B. The opposing side walls define opposing inner surfaces 35B. The bottom horizontal wall 36 defines an outer surface 36A and an inner surface 36B.

The outer surface 32A of the top horizontal wall 32 extends between the outer surface 30A of the cylindrical wall 30 and the outer surface 34A of the vertical wall 34. The outer surface 34A of the vertical wall 34 extends between the outer surface 32A of the top horizontal wall 32 and the outer surface 36A of the bottom horizontal wall 36. The outer surface 36A extends between the outer surface 30A of the cylindrical wall 30 and the outer surface 34A of the vertical wall 34. The inner surface 32B of the top horizontal wall 32 extends between the inner surface 30B of the cylindrical wall 30 and the inner surface 34B of the vertical wall 34. The inner surface 34B of the vertical wall 34 extends between the inner surface 32B of the top horizontal wall 32 and the inner surface 36B of the bottom horizontal wall 36. The inner surface 36B extends between the inner surface 30B of the cylindrical wall 30 and the inner surface 34B of the vertical wall 34.

The inner surface 30B of the cylindrical wall 30, the inner surface 32B of the top horizontal wall 32, the inner surface 34B of the vertical wall 34, and the inner surface 36B of the bottom horizontal wall 36 define a chamber 38 of the mast 24. The chamber 38 extends longitudinally with respect to the vertical axis between the top end 26 and the bottom end 28 of the mast 24. The chamber 38 extends longitudinally with respect to the central vertical axis 22 front side 16 and the back side 18 of the mast 24.

The cylindrical wall 30 further defines a top aperture 40. The top aperture 40 extends between the outer surface 30A and the inner surface 30B of the cylindrical wall 30. The top aperture 40 may include a material with low optical attenuation at optical wavelengths emitted from the mast, including, but not limited to, sapphire glass, fuzed silica glass, or aluminum oxynitride. While the top aperture 40 is depicted as being oval in shape, the top aperture 40 may be any shape. The vertical wall 34 defines a bottom aperture 42. The bottom aperture 42 extends between the outer surface 34A and the inner surface 34B of the vertical wall 34. The bottom aperture 42 may include a transparent material including, but not limited to, sapphire glass. Whole the bottom aperture 42 is depicted as being square in shape, the bottom aperture 42 may be any shape. The bottom aperture 42 is vertically below the top aperture 40. Stated another way, the top aperture 40 is closer to the top end 26 of the mast 24 than the bottom aperture 42. When the top bottom aperture 40 and the bottom aperture 42 include sapphire glass, the sapphire glass may be coated with a material that optimizes the transparency of the sapphire glass as a function of an irradiance of a laser that exits the laser mast 10 at the top aperture 40 or at the bottom aperture 42. As noted the appended claims, the bottom aperture 42 may be referred to as a first aperture and the top aperture 40 may be referred to as a second aperture.

The mast 24 further includes a first mirror 44. In one embodiment, the second first mirror 44 is fixedly attached to the mast 24. In another embodiment, the first mirror 44 is connected to a pivot. The laser mast further includes a pivot 46 and a second mirror 48 that is connected to the pivot 46. The laser mast 10 further includes a first laser source 50. The first laser source 50 is within the chamber 38 of the mast 24. The first laser source 50 is adjacent to the inner surface 34B of the vertical wall 34 and adjacent to the inner surface 35B of the opposing side walls 35. In one embodiment, the first laser source 50 may include a lens.

The laser mast 10 further includes a rotary stage 52. The rotary stage 52 includes a top end 54 and a bottom end 56 that is opposite the top end 54. The top end 54 of the rotary stage 52 is connected to the bottom end 28 of the mast 24. The rotary stage 52 further includes a rotatable portion 58 and a stationary portion 60. The rotatable portion 58 includes a disk 62, a top wall 64, and a cylindrical side wall 66. The disk 58 defines the top end 54 of the rotary stage 52. Hence, the disk 58 is connected to the bottom end 28 of the mast 24. The disk 58 is also connected to the top wall 64. This disk 58 extends longitudinally with respect to the central vertical axis 20 between the top wall 64 and the bottom end 28 of the mast 24. The top wall 64 extends longitudinally with respect to the central horizontal axis 22 between opposing sides of the cylindrical side wall 66. The stationary portion 60 includes a side wall 68 and a bottom wall 70. The bottom wall 70 extends longitudinally with respect to the central horizontal axis 22 between opposing sides of the side wall 68. The bottom wall 70 defines the bottom end 56 of the rotary stage 52.

The disk 62 defines an aperture 72 that extends through the disk 62. The aperture 72 is in open communication with the chamber 38. The top wall 64 defines an aperture 74. The aperture 74 is in open communication with the aperture 72. Hence the aperture 74 is in communication with the chamber 38. The top wall 64, the cylindrical side wall 66, the side wall 68, and the bottom wall 70 define a chamber 76.

The chamber 76 extends longitudinally with respect to the central vertical axis 20 between the top wall 64 of the rotatable portion 58 and the bottom wall 70 of the stationary portion 60. The chamber 76 extends longitudinally with respect to the central horizontal axis 22 between opposing sides of the cylindrical side wall 66 of the rotatable portion 58 and extends longitudinally with respect to the central vertical horizontal axis 22 between opposing sides of the side wall 68 of the stationary portion 60.

The rotary stage 52 includes a motor 78. The motor 78 may be within the chamber 76, however it could be in another location as well. The motor 78 is connected to the top wall 64 of the rotatable portion 58 and the bottom wall 70 of the stationary portion 60. The rotary stage 52 may further include a second laser source 80. In one embodiment, the second laser source 80 is within the chamber 76. In this embodiment, the second laser source 80 is connected to the bottom wall 70 of the stationary portion 60. In one embodiment, the laser mast 10 may include at least one fiber optic cable 81 that extends from the second laser source 80. The fiber optic cable 81 extends from the second laser source 80 longitudinally with respect to the central vertical axis from the second laser source 80 towards the second mirror 48. The fiber optic cable 81 may be carried by a metal cylinder that guides the fiber optic cable 81 from the second laser source 80 towards the second mirror 48. In this embodiment, the metal cylinder may include a lens that caps an end of the metal cylinder that faces the second mirror 48.

As will be discussed in further detail herein, the first laser source 50 may emit a first laser and the second laser source 80 may emit a second laser. The first laser may have a higher irradiance than the second laser. The irradiance of the first laser may prevent the first laser from being carried by a fiber optic as the first laser may burn a fiber optic cable. Placing the first laser source 50 above the rotary stage 52 and placing the second laser source 80 below the rotary stage 52 provides an optical path for the first laser and a separate optical path for the second laser. Providing two separate optical paths allows the laser mast 10 to emit a laser with an irradiance that cannot be carried by a fiber optic cable and a laser with an irradiance that can be carried by a fiber optic cable. Furthermore, placing the second laser source 80 within or below the rotary stage 52 rather than above the rotary stage 52 may stabilize the laser mast 10. That is, if the second laser source 80 was above the rotary stage 52, the laser mast 10 may become top heavy and may tip over when the vehicle 10 fires a projectile. As such, placing the second laser source 80 may stabilize the laser mast 10.

The laser mast 10 further includes a platform 82. The platform 82 is connected to the rotary stage 52. The platform 82 includes a top wall 84 and a cylindrical side wall 86. The top wall 84 of the platform 82 extends longitudinally with respect to the central horizontal axis 22 between opposing sides of the cylindrical side wall 86. The top wall 84 is connected to the side wall 68 of the stationary portion 60 of the rotary stage 52. The cylindrical side wall 86 extends longitudinally with respect to the central vertical axis 20 from the top wall 84. The top wall 84 and the cylindrical side wall 86 define a chamber 88. The chamber 88 extends longitudinally with respect to the central horizontal axis 22 between opposing sides of the cylindrical vertical wall 86. The laser mast 10 further includes a logic 90. The FPGA may be within the chamber 88. In one embodiment, the second laser source 80 may be within the chamber 88. In this embodiment, the bottom wall 70 may define an aperture that extends through the bottom wall 70. In this embodiment, the aperture of the bottom wall 70 is in open communication with the chamber 76 of the rotary stage 52 and is in open communication with the chamber 88 of the platform. Hence, the chamber 88 is in open communication with the chamber 38 of the mast 24.

The logic 90 is connected to the first laser source 50 via plurality of wires 92, is connected to the second laser source 80 via a plurality of wires 94, is connected to the motor 78 via a plurality of wires 96. The laser mast 10 further includes a second logic that that is connected to a second motor. The second motor is connected to the pivot 46. The logic 90 is connected to the second logic via a plurality of wires 98.

Hence, the logic 90 is in communication with the first laser source 50, the second laser source 80, the motor 78, and the second logic that is connected to the pivot 46. In one embodiment, the laser mast 10 may include a radio frequency (RF) antenna. The RF antenna may be located at the top end 12 of the laser mast 10. In this embodiment the RF antenna is connected to the logic 90 via a plurality of wires and as such, the RF antenna is in communication with the logic 90. The RF antenna may allow the logic 90 to communicate with similar logics on other vehicles.

Figure 3:
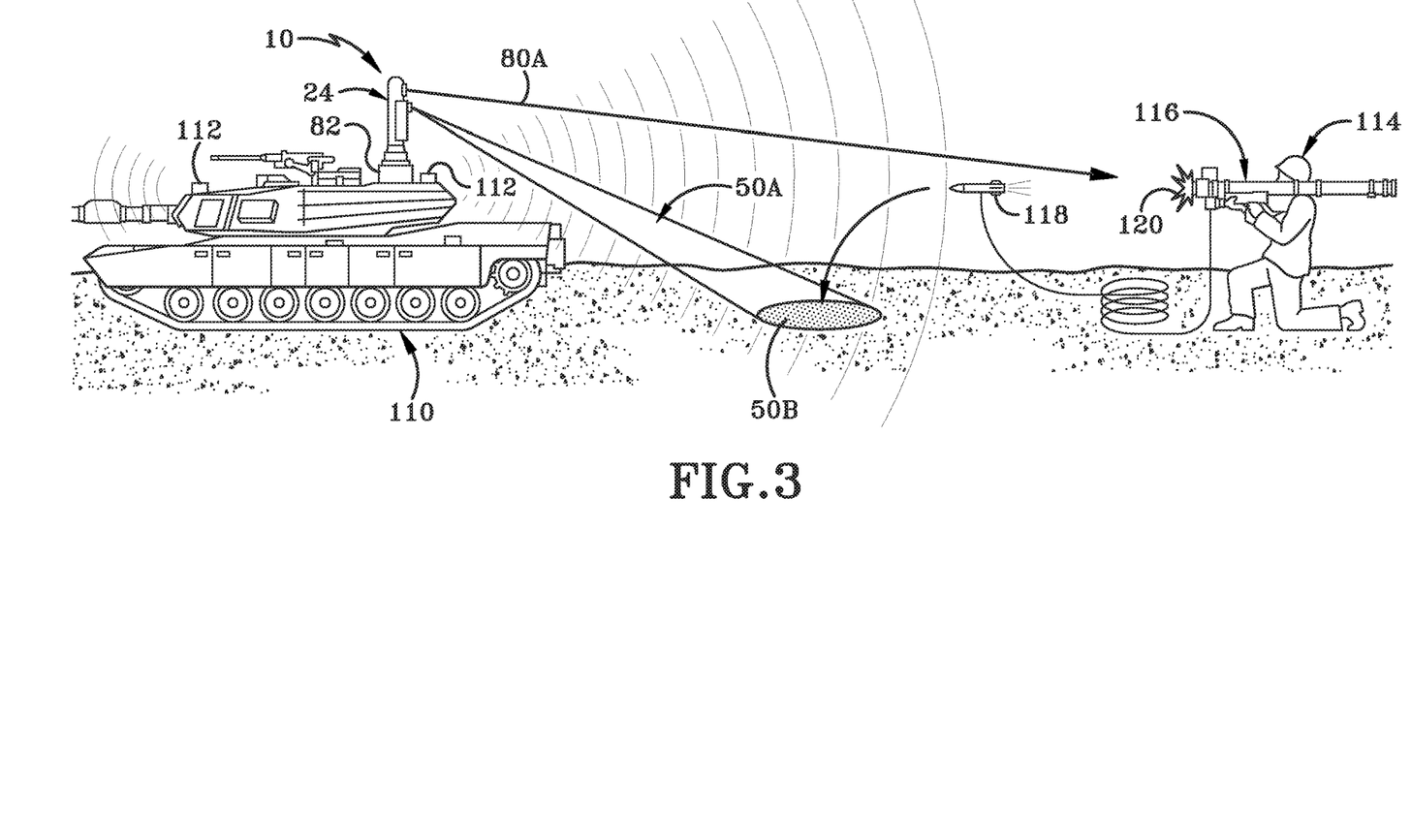
FIG. 3 (FIG. 3) is an operational view of the laser mast of FIG. 1.

FIG. 3 depicts the laser mast 10 connected to a vehicle 110. The vehicle 110 includes at least one threat detector 112. While the vehicle 110 is depicted as a tank, the vehicle 110 may be any vehicle 110 (i.e., a light armored vehicle, an infantry fighting vehicle, an armored personnel carrier, etc.). FIG. 3 further depicts a user 114 with a launcher 116. The user may fire a threat 118 from the launcher 116 at the vehicle 110. The threat detector 112 detects the threat 118. The threat detector 112 may be any detector that is capable of detecting that the launcher 116 has fired the threat 118 at the vehicle 110. In one embodiment, the threat detector 112 includes an optical camera. In this embodiment, four optical cameras are positioned at four corners of the vehicle 110 thereby providing a 360° view from the vehicle 110. Accordingly, the threat detectors 112 may detect a threat 1116 from any position relative to the vehicle 110. Furthermore, in this embodiment, the threat detectors 112 detect when the threat 1116 is fired form the launcher 116 by detecting light 120 emitted from the launcher 116 when the launcher 116 fires the threat 1116.

The threat detector 112 determines an angle of arrival of the threat 118 relative to a center of the laser mast 10, wherein the center of the laser mast 10 defines an origin of a standard Cartesian plane. In the embodiment wherein the threat detector 112 includes optical cameras, the threat detector 112 determines the position of the light emitted by the launcher 116 when the launcher 116 fires the threat 118 relative to the laser mast 10. The threat detector 112 then determines the angle of arrival of the threat 118 as a function of the determined positon of the light emitted by the launcher 116.

The threat detector 112 is connected to and in communication with the logic 90 of the laser mast 10. When the threat detector 112 detects the launcher 116 has fired the threat 118 at the vehicle 110, the threat detector 112 sends a signal indicative of an incoming threat to the laser mast 10. The signal indicative of an incoming threat includes the determined angle of arrival of the threat 118. Returning briefly to FIG. 2, the motor 78 causes the rotatable portion 58 of the rotary stage 52 to rotate. Since the disk 62 of the rotary stage 52 is connected to the mast 24, rotating the disk 62 rotates the mast 24. Hence, the motor 78 rotates the mast 24. The motor 78 may rotate the mast 24 to rotate 360°. While the vehicle 110 is in operation the mast 24 may be constantly rotating. When the logic 90 receives the signal indicative of the incoming threat, the logic 90 sends a signal indicative of the determined angle of arrival to the motor 78 via the plurality of wires 96 which causes the motor 78 to rotate the mast 24 to the determined angle of arrival such that the top aperture 40 and the bottom aperture 42 are oriented along the determined angle of arrival so that the top aperture 40 and the bottom aperture 42 face the launcher 116 and the threat 118. The plurality of wires 96 may include motor position +/− wires and motor status +/− wires. The logic 90 may send the signal indicative of the determined angle of arrival to the motor 78 via the motor position +/− wires. Furthermore, the motor 78 may send signals indicative of the status of the motor 78 to the logic 90 via the motor status +/− wires. The signals indicative of the status of the motor 78 may include signals indicative of the current and temperature of the motor 78.

There are two threat scenarios depicted in FIG. 3. First, an electro-optic cueing sensor detects the missile launch, providing an azimuth and elevation vector from the SKCM to the missile launcher. The SKCM directs beam 80A at the guidance system in the launcher. The beam causes the guidance system to lose track of threat 118 and sends invalid guidance commands to the threat, causing it to miss the target. In the second scenario, a laser target designator (LTD) first illuminates the target vehicle with a laser spot. A missile is launched from a ground or air platform. The missile contains an internal guidance system consisting of a seeker (camera, electro-optic sensors, etc.) in the nose cone which guides the missile towards the spot produced by the LTD. The SKCM's Laser Warning Receiver (LWR) system detects the laser energy from the LTD. The SKCM emits a decoy beam 50A which produces a decoy spot 50B on the ground away from the vehicle. The missile seeker is preferential to spot 50B because 50B is brighter than the LTD spot, therefore the missile guidance system guides the missile toward the location of spot 50B, missing the vehicle.

In one embodiment, the vehicle 110 may be moving when the threat detector 112 detects the launcher 116 has fired the threat 118 at the vehicle 110. In this embodiment, the threat detector 112 continuously updates the angle of arrival relative to the laser mast 10 as the vehicle 110 is moving and continuously sends signals indicative of an incoming threat to the logic 90. The signals indicative of the incoming threat includes the updated angle of arrival. In another embodiment, the laser mast 10 may contain an inertial measurement unit (IMU) which allows for tracking vehicle motion. The IMU continuously provides vehicle motion information to logic 90 that may be used to recalculate the launcher angle relative to the vehicle as the vehicle moves. As such, the mast 24 continuously rotates to the updated angle of arrival such that the top aperture 40 and the bottom aperture 42 are continuously oriented along the updated angle of arrival so that the top aperture 40 and the bottom aperture 42 continuously face the launcher 116 and the threat 118.

In another embodiment, the vehicle 110 may be stationary when the threat detector 112 detects the launcher 116 has fired the threat 118 at the vehicle 110. In this embodiment, the threat detector 112 continuously determines the angle of arrival as the same angle of arrival as the originally determined angle of arrival. The threat detector 112 continuously sends signals indicative of the incoming threat to the logic 90 that includes a same angle of arrival as the originally determined angle of arrival to the laser mast 112. Accordingly, when the vehicle 110 is stationary, the mast 24 does not continue to rotate.

The logic 90 sends a signal to the second logic via the plurality of wires 98. The plurality of wires 98 may include uplink +/− wires and downlink +/− wires that allow the logic 90 to communicate with the second logic. The logic 90 may send the signal to the second logic via the uplink +/− wires. The signal includes instructions to rotate the second mirror 48 as a function of the determined position of the light 120 emitted by the launcher 116. In response to receiving the signal, the second logic causes the second motor to rotate the second mirror 48 as a function of the signal. For example, the threat detector 112 may determine that the position of the light is 15° angle higher than the horizontal axis 22 of the laser mast 10. In this example, the logic 90 sends the signal to the second logic that includes instructions to rotate the mirror to an angle that corresponds to 15° higher than the horizontal axis 22 of the laser mast 10. After causing the second mirror 48 to rotate, the second logic sends a signal indicative of the position of the second mirror 48 via the plurality of wires 98. The second logic may send the signal to the logic 90 via the downlink +/− wires. In response to the receiving the signal, the logic 90 determines if position of the second mirror 48 corresponds to the determined position of the light 120. If it does not, then the logic 90 sends a signal to the second logic that causes the second mirror 48 to rotate as a function of the determined positon of the light 120. In the embodiment wherein the first mirror 44 is connected to a pivot, the pivot that is connected to the first mirror 44 is also connected to a third motor. The third motor may be connected to the second logic via a plurality of wires. The second logic sends a signal to the third motor that causes the third motor to rotate the first mirror 44.

After rotating to the determined angle of arrival, the logic 90 sends a first fire signal to the first laser source 50 via the plurality of wires 92 and sends a second fire signal to the second laser source 80 via the plurality of wires 94. The plurality of wires 92 and the plurality of wires 94 may include trigger +/− wires that carry the fire signals to the first laser source 50 and the second laser source 80. The plurality of wires 92 and the plurality of wires 94 may further include laser interlock +/− wires that may prevent the first laser source 50 and the second laser source 80 from misfiring.

In response to receiving the first fire signal, the first laser source 50 emits a first laser 50A. The first laser 50A reflects off of the first mirror 44 and exits the mast 24 at the bottom aperture 42. Since the mast 24 has rotated to the determined angle of arrival, the first laser 50A exits the mast 24 toward the launcher 116 and toward the threat 118. The first mirror 44 is angled such that the first laser 50A reflects off of the first mirror, exits the mast 24 and strikes the ground a predetermined distance away from the vehicle 110 at 50B. In the embodiment wherein the first laser source 50 includes a lens, the lens may shape the laser 50A such that when the laser 50A strikes the ground the first laser 50A has a circular shape.

The threat 118 may include an optical guidance system that guides the threat towards a laser reflection off the target vehicle created by laser emission from a laser target designator (LTD) beam pointed at the vehicle. The optical guidance system of the threat 118 determines a location of the vehicle 110 by detecting the reflected LTD optical beam. The optical guidance system of the threat 118 determines the location of the vehicle 110 by detecting light that corresponds to the vehicle 110 within a field of view of the optical guidance system. Accordingly, the optical guidance system of the threat 118 determines the location of the vehicle 110 as a function of detected light. In this embodiment, the optical guidance system of the threat 118 may determine if the threat 118 is on course to strike the vehicle 110 as a function of the determined position of the vehicle 110 and a current trajectory of the threat 118. If the optical guidance system of the threat 118 determines that the threat 118 is not on course to strike the vehicle 110, the optical guidance system of the threat 118 may cause the threat 118 to alter its trajectory as a function of the determined location of the vehicle 110 which may place the threat 118 on course to strike the vehicle 110.

The vehicle may contain a laser energy detector, also known as a laser warning receiver (LWR) which detects the laser beam energy from the LTD that is reflected off of the vehicle. The first laser 50A may cause the threat 118 to alter its trajectory away from the vehicle 110. As described herein, the first laser 50A is emitted in the direction of the launcher 116 and the threat 118 and strikes the ground a predetermined distance away from the vehicle 110. Furthermore, the first laser 50A has a light signature that corresponds to light that the optical guidance system of the threat 118 detects as corresponding to the LTD beam's reflection off of vehicle 110. The threat is looking for the laser target designator's optical beam spot reflected off of the vehicle. Laser 50A emits a beam to create a spot on the ground that mimics the LTD spot in a way that makes it more attractive to the threat (i.e. it is brighter). As such, the optical guidance system of the threat 18 may detect the first laser 50A at the predetermined distance away from the vehicle 110. When the optical guidance system of the threat 118 detects the first laser 50A, the optical guidance system of the threat 118 may determine the location of the vehicle 110 corresponds to the location of the first laser 50A at the predetermined distance away from the vehicle 110 which may cause the optical guidance system of the threat 118 to incorrectly determine the location of the vehicle 110. After determining the location of the vehicle 110 as the location of the first laser 50A at the predetermined distance away from the vehicle 110, the optical guidance system of the threat 118 may cause the optical guidance system to alter the trajectory of the threat 118 towards the first laser 50A at the predetermined distance away from the vehicle 110 until the threat 118 strikes the ground at the predetermined distance away from the vehicle 110. Accordingly, the first laser 50A may cause the threat 118 to miss the vehicle 110 by causing an optical guidance system of the threat 118 to identify a location of the first laser 50A as the location of the vehicle 110.

The laser mast 10 emits first laser 50A to the predetermined distance away from vehicle 110 as a function of a type of the vehicle 110. Different vehicles 110 may have different armor that may be able to withstand shrapnel from the threat 118 at varying distances. In one example, the vehicle 110 may be a tank that can withstand a direct hit from the threat 118. In this example, the laser mast 10 may emit the first laser 50A such that the first laser 50A strikes the ground one meter away from the vehicle 110. In another example, the vehicle 110 may be a Humvee that can withstand shrapnel from the threat 118 that occurs seven meters from the vehicle 110. In this example, the laser mast 10 may emit the first laser 50A such that the first laser 50A strikes the ground ten meters away from the vehicle 110. Accordingly, the first laser 50A may cause the threat 118 to strike the ground a distance away from the vehicle 110 as a function of the type of the vehicle 110.

In response to receiving the second fire signal, the second laser source 80 emits a second laser 80A. The second laser reflects off of the second mirror 48 and exits the mast 24 at the top aperture 40. Since the mast 24 has rotated to the determined angle of arrival and since the second mirror has rotated a function of the determined positon of the light 120, the second laser 80A exits the mast 24 toward the launcher 116 and toward the threat 118. The plurality of wires 92 that connect the first laser source 50 to the logic 80 and the plurality of wires 94 that connect the second laser source 80 to the logic 90 may include trigger +/− wires and sync +/− wires that allow the logic 90 to synchronize the firing of first laser 50A and the second laser 80A. In one embodiment, the second laser source 80 may be capable of emitting a second laser 80A with one of three different irradiances. In this embodiment, three fiber optic cables 81, each corresponding to a laser with different irradiance, may carry the second laser 80A from the second laser source 80 toward the second mirror 48. In another embodiment, the second laser 80A may include three lasers, each with a different irradiance and three fiber optic cables 81 may carry the three different lasers. Furthermore, the first laser 50A has a first irradiance and the second laser 80A has a second irradiance that different from the first irradiance. Further, logic 90 may cause the emission of one or more, only two, at least two, or more than three lasers at the same time.

The second laser 80A may cause the threat 118 to miss the vehicle 110. The launcher 116 may include an optical guidance system that guides the threat 118 towards the vehicle 110. The optical guidance system of the launcher 116 may include a plurality of sensors that determine the position of the threat 118 within a field of view of the optical guidance system. The threat 118 may include a light that, when fired, faces the optical guidance system of the launcher 116. The optical guidance system of the launcher 116 may determine the positon of the threat 118 as a function of the position of the light on the threat 118. The optical guidance system of the launcher 116 may further include a telescopic sight with a reticle. The user 114 may look down the telescopic sight and aim the reticle at the vehicle 110. The optical guidance system may determine if the trajectory of the threat 118 is on course to strike the vehicle 110 as a function of the determined position of the threat 118 and the position of the reticle.

The optical guidance system of the launcher 116 is connected to the threat 118. While the optical guidance system of the launcher 116 is depicted as connected to the threat 118 via a wire, the connection may be wireless. If the optical guidance system of the launcher 116 determines that the threat 118 is not on course to strike the vehicle 110, then the optical guidance system may send signals that correspond to an altered trajectory to the threat 118 via the connection. The threat 118 receives the signals from the optical guidance system and alters its trajectory as a function of the received signals which may place the threat 118 on course to strike the vehicle 110.

The second laser 80A may prevent the optical guidance system of the launcher 116 from alter the trajectory of the threat 118. The optical guidance system of the launcher 116 may incorrectly determine the laser 80A is the light on the back of the threat 118. Furthermore, since the second laser 80A is emitted in the direction of the launcher 116, the optical guidance system determines that the position of the first laser is the same as the positon of the reticle of the telescopic scope. As such, the optical guidance system of the launcher 116 may incorrectly determine that the threat 118 is on course to strike the vehicle 110. Accordingly, the optical guidance system of the launcher 116 may not send signals corresponding to an altered trajectory to the threat 118. Hence, if the threat 118 is not on course to strike the vehicle 110 and the second laser 80A prevents the optical guidance system of the launcher 116 from altering the trajectory of the threat 118, the threat 118 may miss the vehicle 110. In another example, the optical guidance system of launcher 116 detects laser 80A as the threat location. In this example, the location of laser 80A is in the field of view is above the targeting reticle of the guidance system. Accordingly, the optical guidance system of launcher 116 may send signals to guide the threat downward to attempt to move the perceived threat location toward the reticle location in the field of view. These guidance commands to steer the threat downward continue because the location of laser 80A continues to be above the target reticle location in the field of view and the guidance system continues to perceive the light emitted by laser 80A as the threat location. The result is the threat impacts the ground before reaching the vehicle location due to repetitive downward guidance commands.

Figure 4:
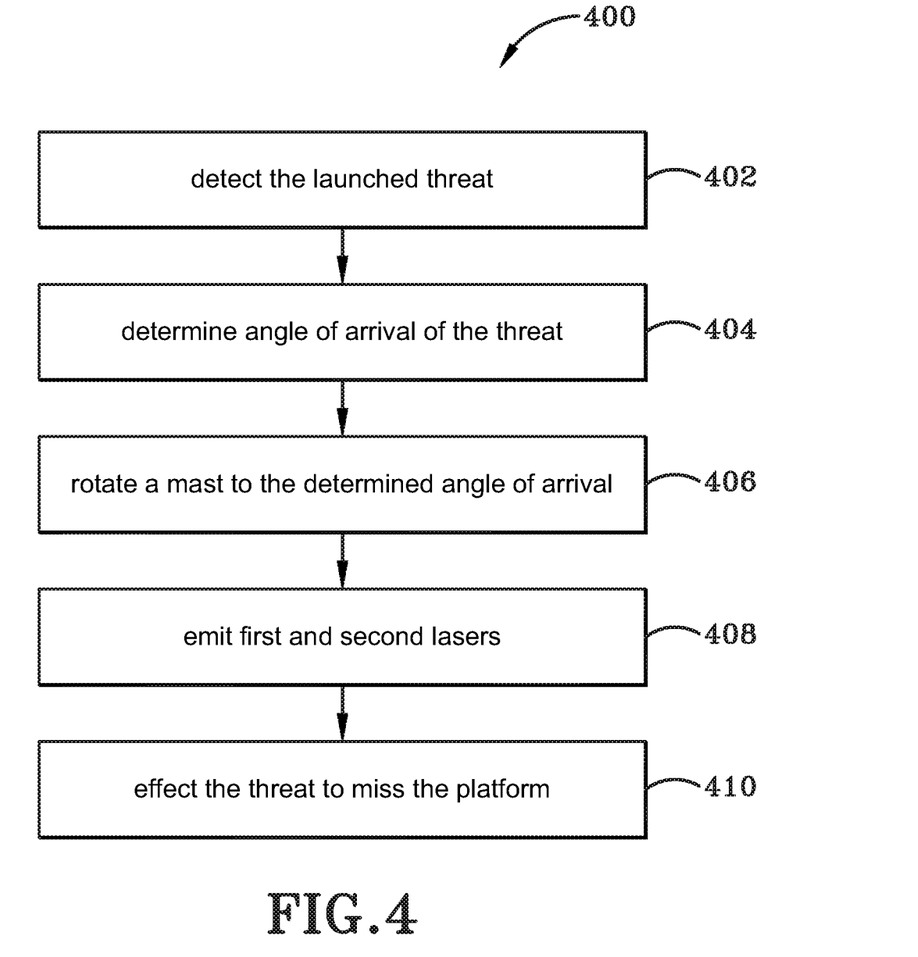
FIG. 4 (FIG. 4) depicts a system or method for causing a threat to miss a vehicle.

FIG. 4 depicts a method or system 400 for causing a threat 118 to miss a vehicle 110. At 402, a threat detector 112 detects a launcher 116 has launched the threat 118 at the vehicle 110 as described herein. At 404, the threat detector 112 determines an angle of arrival of the threat 118 as described herein. At 406, a mast 24 of a laser mast 10 rotates to the determined angle of arrival as described herein. At 408, the laser mast emits a first laser 50A and a second laser 80A as described herein. At 410, the first laser 50A or the second laser 80A causes the threat 118 to miss the vehicle 110 as discussed herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for diverting an incoming threat from a platform, the method comprising: detecting an incoming threat; in response to detecting the incoming treat, determining a first angle of arrival of the incoming threat; emitting a first laser beam from a first laser source located substantially within a laser mast connected to the platform, wherein the first laser beam is emitted from a first aperture of the laser mast at the first determined angle of arrival; emitting a second laser beam from a second laser source from the laser mast, wherein the second laser beam is emitted from a second aperture of the laser mast at the first determined angle of arrival; reflecting at a first mirror the first laser beam at a first angle; reflecting at a second mirror the second laser beam at a second angle; altering a trajectory of the incoming threat using the first laser beam; and preventing a guidance system of a launcher that fired the incoming threat from altering the trajectory of the incoming threat using the second laser beam; wherein the first laser beam has a greater irradiance than the second laser beam.

2. The method of claim 1, wherein the first laser beam causes the guidance system of the incoming threat to alter the trajectory of the incoming threat towards the second laser beam.

3. The method of claim 2, further comprising:
emitting the first laser toward a ground location a distance away from the platform.

4. The method of claim 3, wherein the platform is a ground vehicle and the distance away from the ground vehicle is determined as a function of a type of the ground vehicle.

5. The method of claim 1, wherein the first laser beam has a first irradiance and the second laser beam has a second irradiance.

6. The method of claim 1, further comprising:
rotating the laser mast to the first determined angle of arrival; and
in response to rotating the laser mast to the first determined angle of arrival, emitting the first laser beam and the second laser beam at the first determined angle of arrival.

7. The method of claim 1, further comprising:
determining a second angle of arrival of the incoming threat;
rotating the laser mast to the second determined angle of arrival; and
emitting the first laser beam and the second laser beam at the second determined angle of arrival.

8. The method of claim 1, wherein the second laser beam is emitted towards a launcher that fired the incoming threat.

9. A laser mast for attachment to a platform comprising: a mast including a first aperture and a second aperture; a rotary stage connected to the mast, wherein the rotary stage is configured to rotate the mast; a platform connected to the rotary stage; a first laser source that is substantially within the mast; and a second laser source that is proximate the rotary stage or the platform; wherein the first laser source emits a first laser beam that exits the mast at the first aperture and the second laser source emits a second laser beam that exits the mast at the second aperture; and a first mirror reflects the first laser beam at a first angle and a second mirror configured to reflect the second laser beam at a second angle; wherein the first laser beam has a greater irradiance than the second laser beam such that the first laser beam is capable of causing a guidance system of an incoming threat to alter a trajectory of the incoming threat and the second laser beam is capable of preventing the guidance system of a launcher that fired the incoming threat from altering the trajectory of the incoming threat.

10. The laser mast of claim 9, wherein the first angle is approximately an angle of the incoming threat.

11. The laser mast of claim 10, wherein the rotary stage is configured to rotate the laser mast to the angle of the incoming threat.

12. The laser mast of claim 9, wherein the second angle is approximately an angle of the launcher.

13. The laser mast of claim 12, wherein the rotary stage is configured to rotate the laser mast to the angle of the launcher.

14. The laser mast of claim 9, wherein when the laser mast is attached to the platform, and wherein the first laser source is vertically above the second laser source.

15. The laser mast of claim 9, wherein the first laser source is substantially within the mast and the second laser source is substantially within or below the rotary stage or substantially within the platform.

16. The laser mast of claim 9, wherein when the laser mast is attached to the platform, the first aperture is vertically below the second aperture.

17. The laser mast of claim 9, further comprising: the first mirror within the mast, wherein the first mirror is fixedly attached to the mast and wherein the first mirror reflects the first laser beam; and the second mirror within the mast, wherein the second mirror is rotatably attached to a pivot and wherein the second mirror reflects the second laser beam.

18. The laser mast of claim 9, wherein the first laser beam has a first irradiance and the second laser beam has a second irradiance.

* * * * *

UNITED STATES PATENT AND TRADEMARK OFFICE
CERTIFICATE OF CORRECTION

| | | |
|---|---|---|
| PATENT NO. | : 11,248,879 B1 | Page 1 of 1 |
| APPLICATION NO. | : 16/916251 | |
| DATED | : February 15, 2022 | |
| INVENTOR(S) | : David A. Barfoot et al. | |

It is certified that error appears in the above-identified patent and that said Letters Patent is hereby corrected as shown below:

On the Title Page

Item (72), Line 2:
"Jeffrey Easton, Leander, TX (US);"

Should read:
-- Jeffrey Eaton, Leander, TX (US); --

Signed and Sealed this
Seventeenth Day of May, 2022

Katherine Kelly Vidal
*Director of the United States Patent and Trademark Office*